(12) United States Patent
Shoffler

(10) Patent No.: US 9,951,620 B1
(45) Date of Patent: Apr. 24, 2018

(54) WORKING FLUID TURBO

(71) Applicant: David A Shoffler, Marion Heights, PA (US)

(72) Inventor: David A Shoffler, Marion Heights, PA (US)

( * ) Notice: Subject to any disclaimer, the term of this patent is extended or adjusted under 35 U.S.C. 154(b) by 200 days.

(21) Appl. No.: 14/676,279

(22) Filed: Apr. 1, 2015

Related U.S. Application Data

(60) Provisional application No. 61/974,623, filed on Apr. 3, 2014.

(51) Int. Cl.
*F01D 1/36* (2006.01)
*F01D 13/02* (2006.01)

(52) U.S. Cl.
CPC .............. *F01D 1/36* (2013.01); *F01D 13/02* (2013.01)

(58) Field of Classification Search
CPC ........... F01D 1/36; F01D 13/02; F04D 29/601
USPC ..................... 415/4.1, 90; 417/407
See application file for complete search history.

(56) References Cited

U.S. PATENT DOCUMENTS

| | | | | |
|---|---|---|---|---|
| 4,218,176 A * | 8/1980 | Gawne | ...................... | F01D 1/34 415/201 |
| 4,280,791 A * | 7/1981 | Gawne | ...................... | F01D 1/34 415/152.2 |
| 6,174,127 B1 * | 1/2001 | Conrad | ...................... | A47L 5/22 415/1 |
| 6,183,641 B1 * | 2/2001 | Conrad | ...................... | A47L 5/22 209/12.1 |
| 6,368,078 B1 * | 4/2002 | Palumbo | ................... | F01D 1/36 415/202 |
| 6,425,737 B1 * | 7/2002 | Hatanaka | .................. | F01D 1/34 415/199.2 |
| 6,692,232 B1 * | 2/2004 | Letourneau | ............... | F01D 1/36 415/90 |
| 8,764,399 B1 * | 7/2014 | Linscott | .................... | F01D 1/36 416/177 |
| 2003/0086782 A1 * | 5/2003 | Moorehead | ............... | F01D 1/36 415/1 |
| 2005/0002776 A1 * | 1/2005 | Davis | ..................... | B82Y 15/00 415/90 |
| 2005/0019154 A1 * | 1/2005 | Dial | .......................... | F01D 1/36 415/90 |
| 2005/0169743 A1 * | 8/2005 | Hicks | ..................... | B82Y 30/00 415/90 |
| 2011/0097189 A1 * | 4/2011 | Sandoval | .................. | F01D 1/36 415/68 |

* cited by examiner

*Primary Examiner* — Aaron R Eastman
(74) *Attorney, Agent, or Firm* — John J. Elnitski, Jr.

(57) ABSTRACT

A working fluid turbo comprising an enclosed housing; an intake port; an exhaust port; at least two sets of a plurality of disks within the housing; and a shaft connected to at least one set of the at least two sets of plurality of disks. The at least two sets of a plurality of disks has a first set of disks aligned with the intake port and a second set of disks aligned with the exhaust port. The shaft connects to at least one set of the at least two sets of disks. The first set of disks and the second set of disks each include an end plate with X-shaped walls that forms an X-shaped disk shaft, whereby the X-shaped disk shaft allows the working fluid to move between solid disks and holed disks.

5 Claims, 15 Drawing Sheets

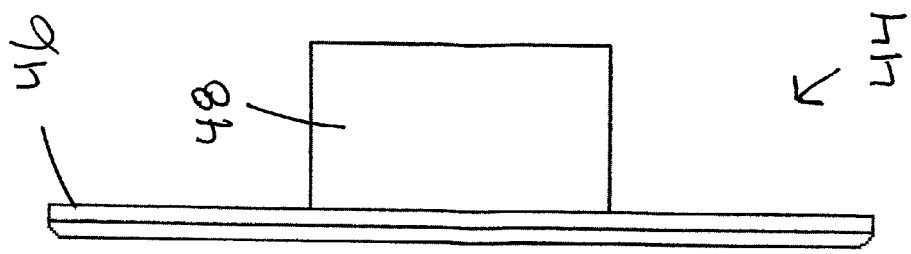
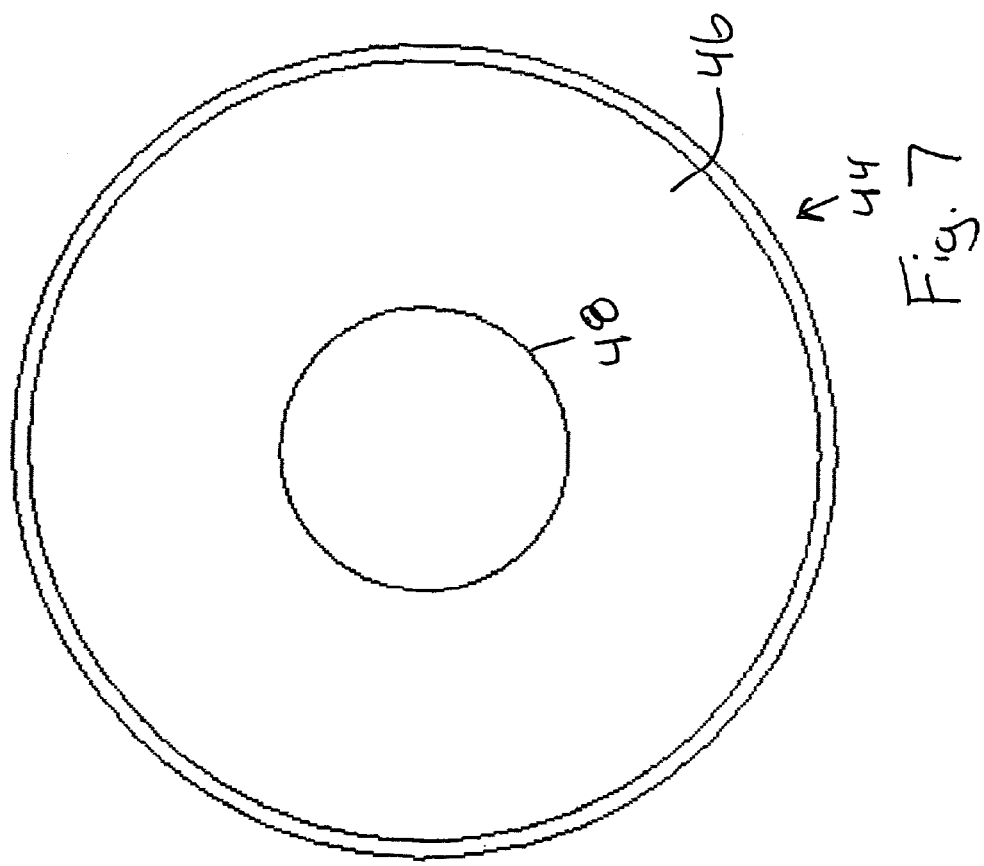
Fig. 7

WORKING FLUID TURBO

This application claims the benefit of and incorporates by reference U.S. Provisional Application No.: 61/974,623, filed Apr. 3, 2014

BACKGROUND

The present invention generally relates to power generation using a working fluid. More specifically, the present invention relates to power generation using a working fluid moving in a rotational direction.

There are many devices that use a working fluid to generate power. Such examples are water flowing over a water wheel or wind turning a windmill. These examples are usually one shot deals when the flow of water or wind are not magnified. What is needed is a way to amplify the potential power of the working fluid.

It is an object of the present invention to provide an apparatus and method to provide power generation using a working fluid to generate rotational energy.

BRIEF DESCRIPTION OF DRAWINGS

FIG. 7 is a perspective view of a center spacer according to the present invention.

SUMMARY OF THE INVENTION

A working fluid turbo comprising an enclosed housing; an intake port; an exhaust port; at least two sets of a plurality of disks within the housing; and a shaft connected to at least one set of the at least two sets of plurality of disks. The at least two sets of a plurality of disks has a first set of disks aligned with the intake port and a second set of disks aligned with the exhaust port. The shaft connects to at least one set of the at least two sets of disks. The first set of disks and the second set of disks each include an end plate with X-shaped walls that forms an X-shaped disk shaft, whereby the X-shaped disk shaft allows the working fluid to move between solid disks and holed disks.

DETAILED DESCRIPTION

Figure 1:
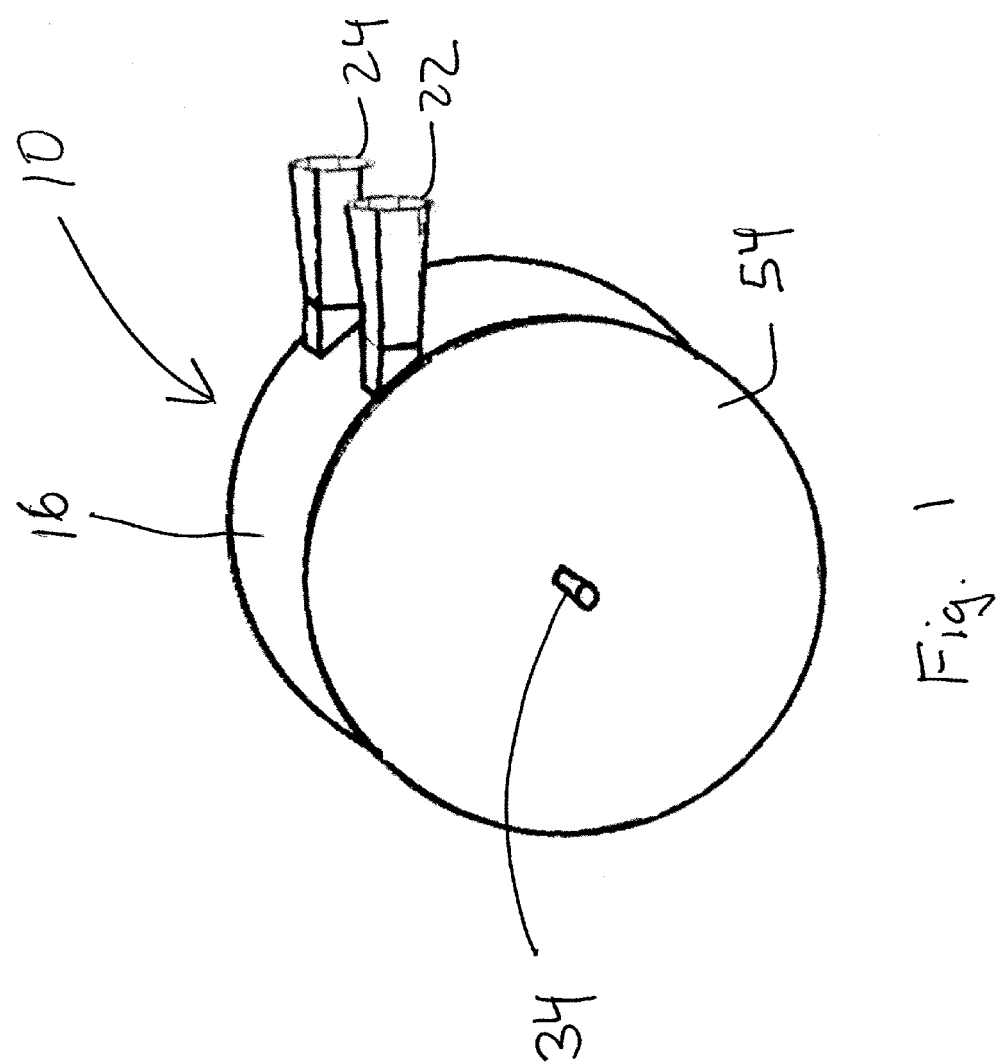
FIG. 1 is a perspective view of a working fluid turbo according to the present invention.
Figure 2:
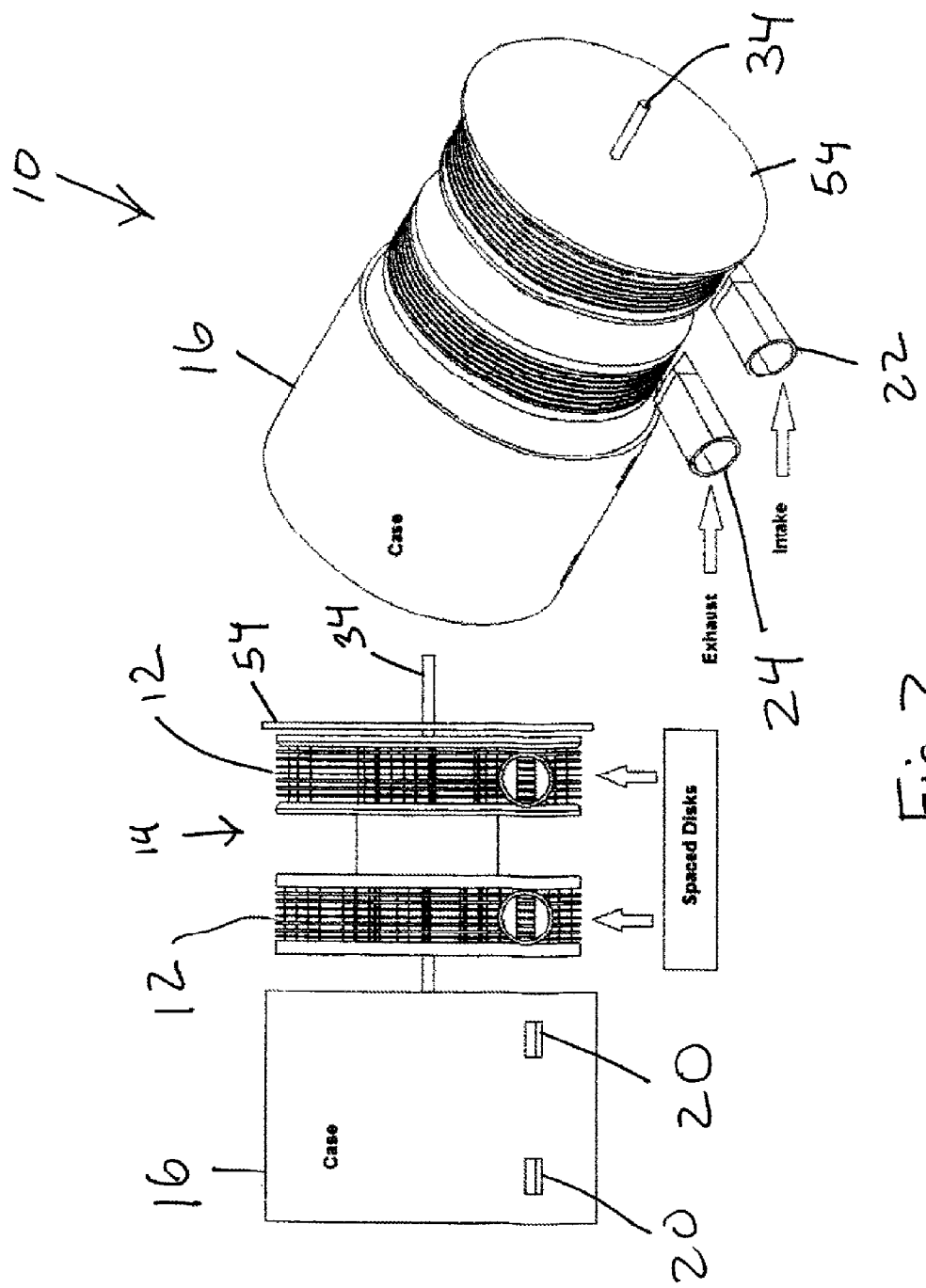
FIG. 2 is an exploded perspective view of a working fluid turbo according to the present invention.
Figure 3:
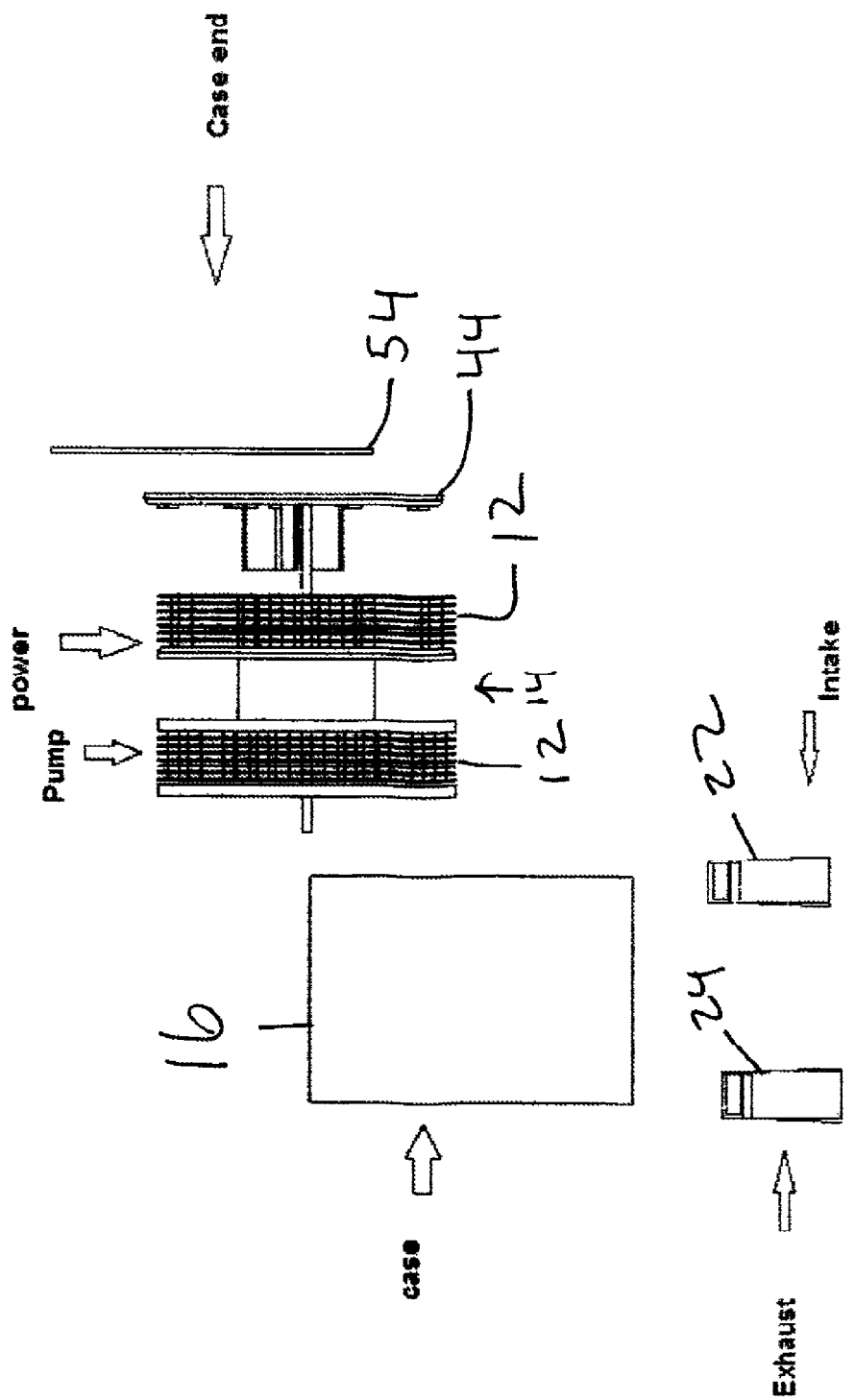
FIG. 3 is an exploded view of a working fluid turbo according to the present invention.
Figure 4:
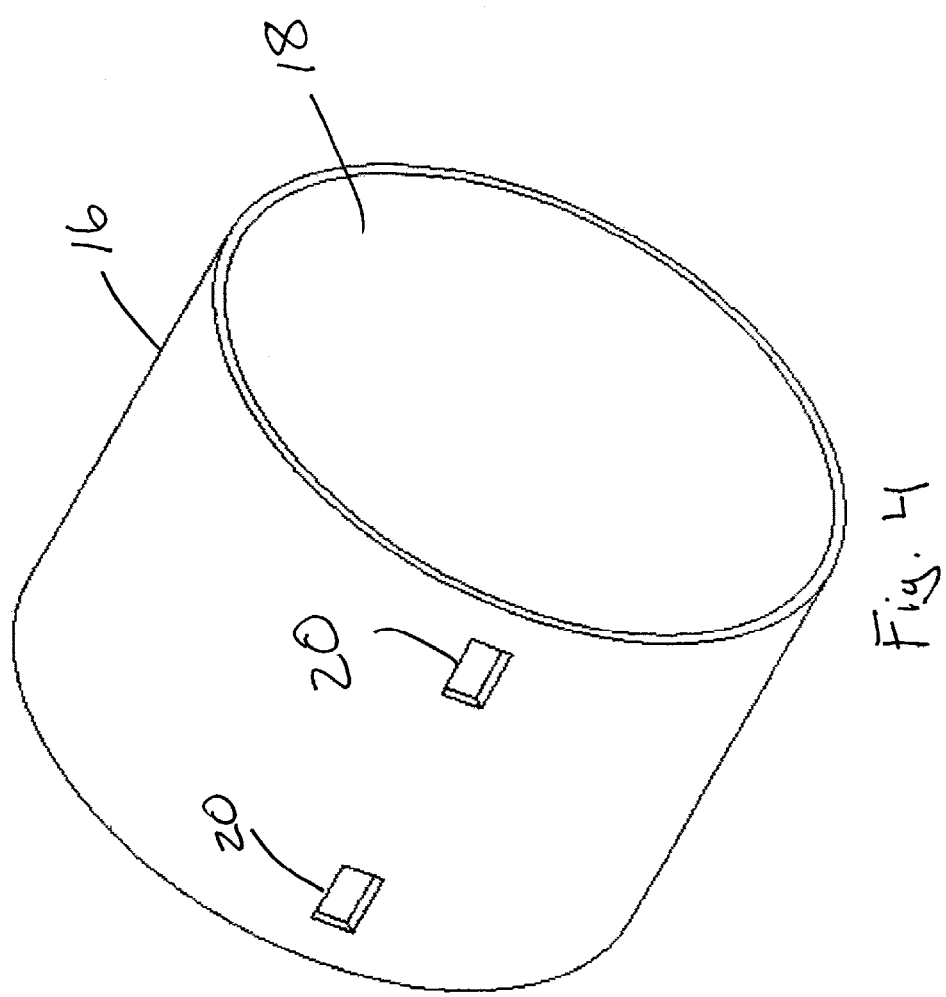
FIG. 4 is a perspective view of a housing according to the present invention.
Figure 5:
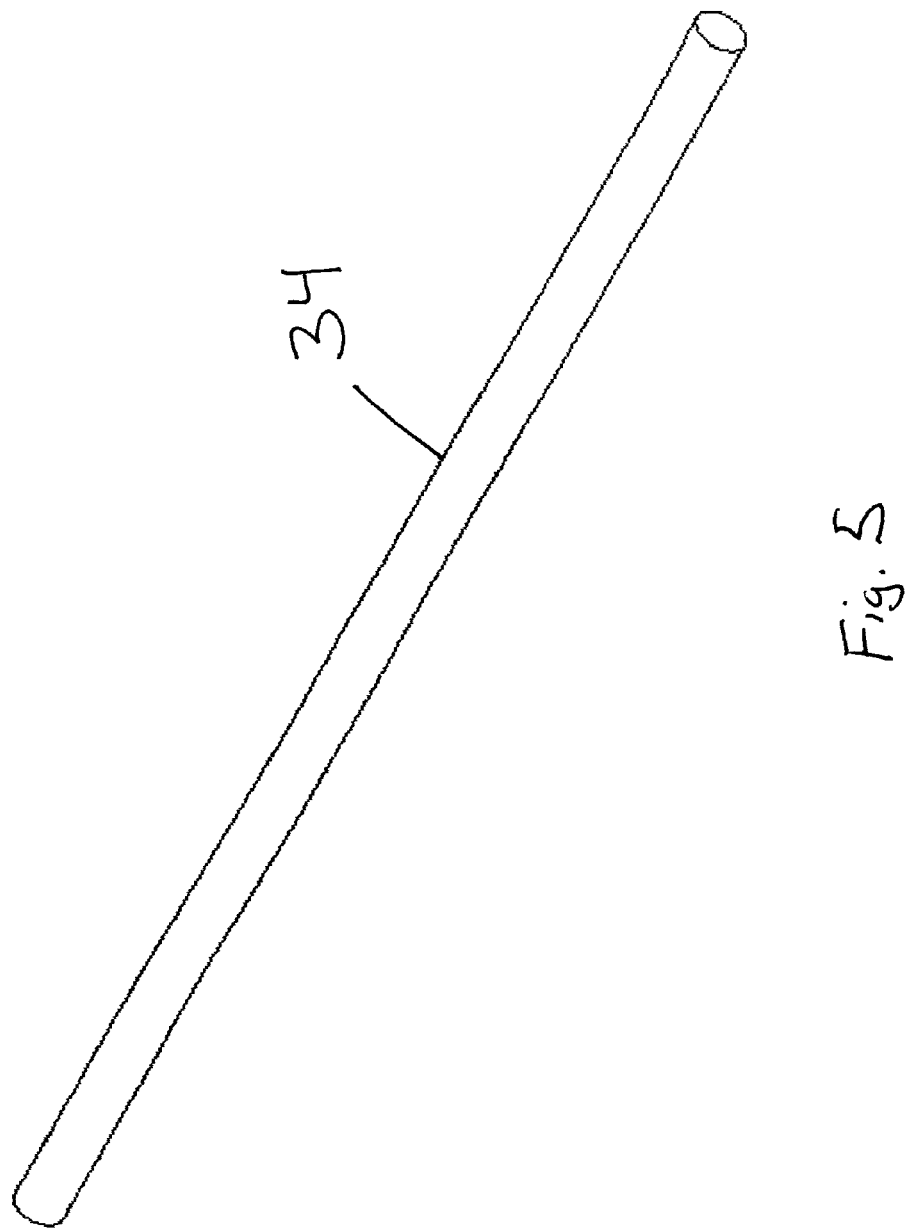
FIG. 5 is a perspective view of a shaft according to the present invention.
Figure 6:
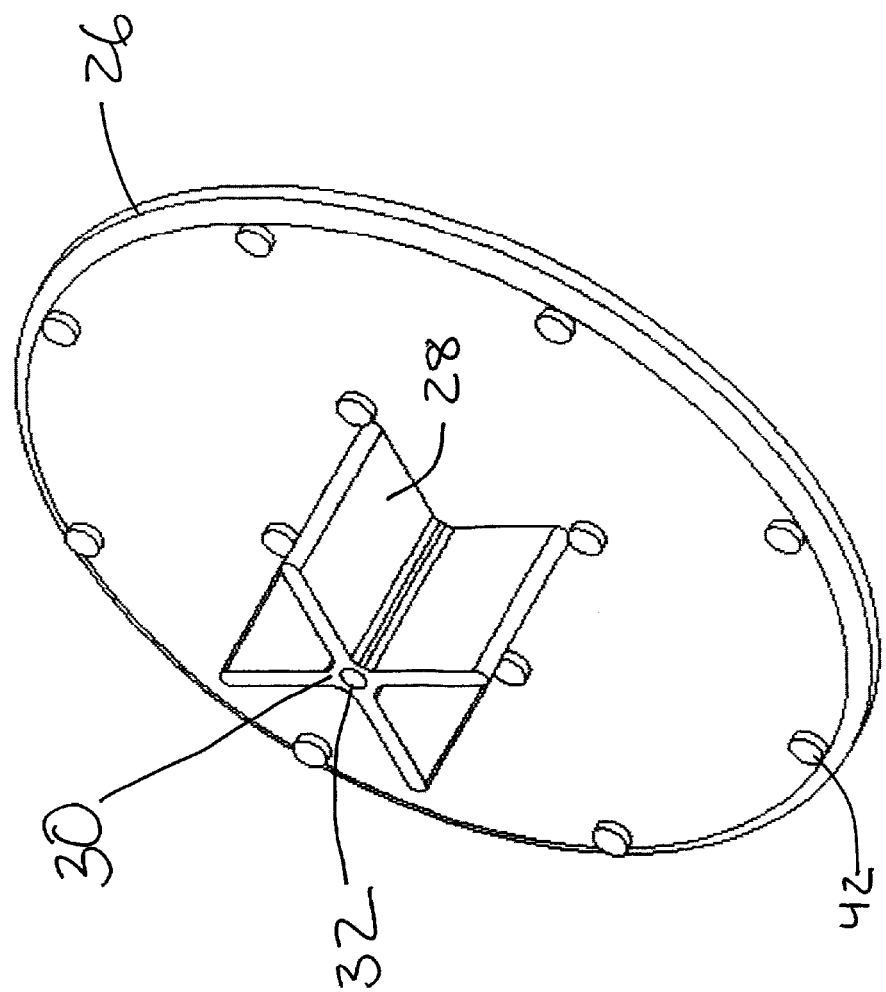
FIG. 6 is a perspective view of an end plate according to the present invention.
Figure 8:
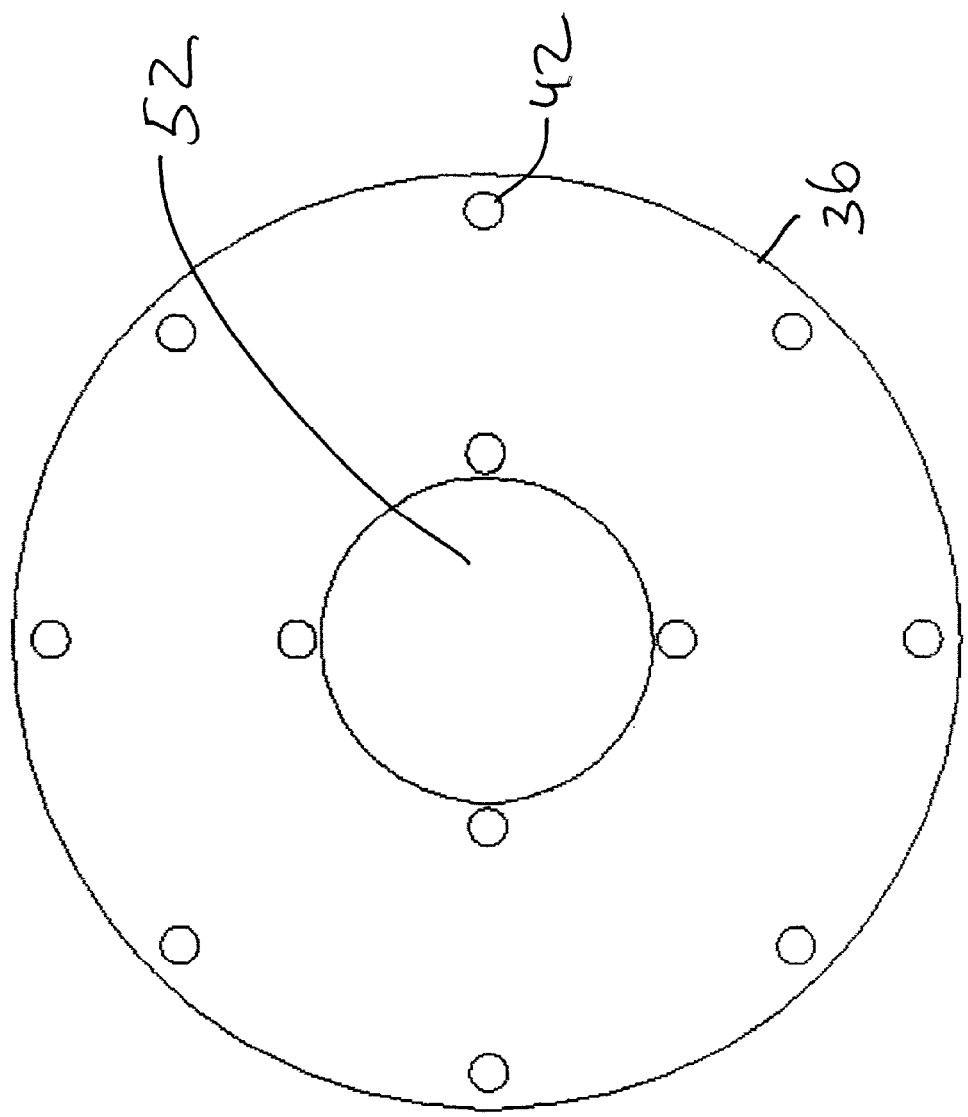
FIG. 8 is a side view of a solid disk according to the present invention.
Figure 9:
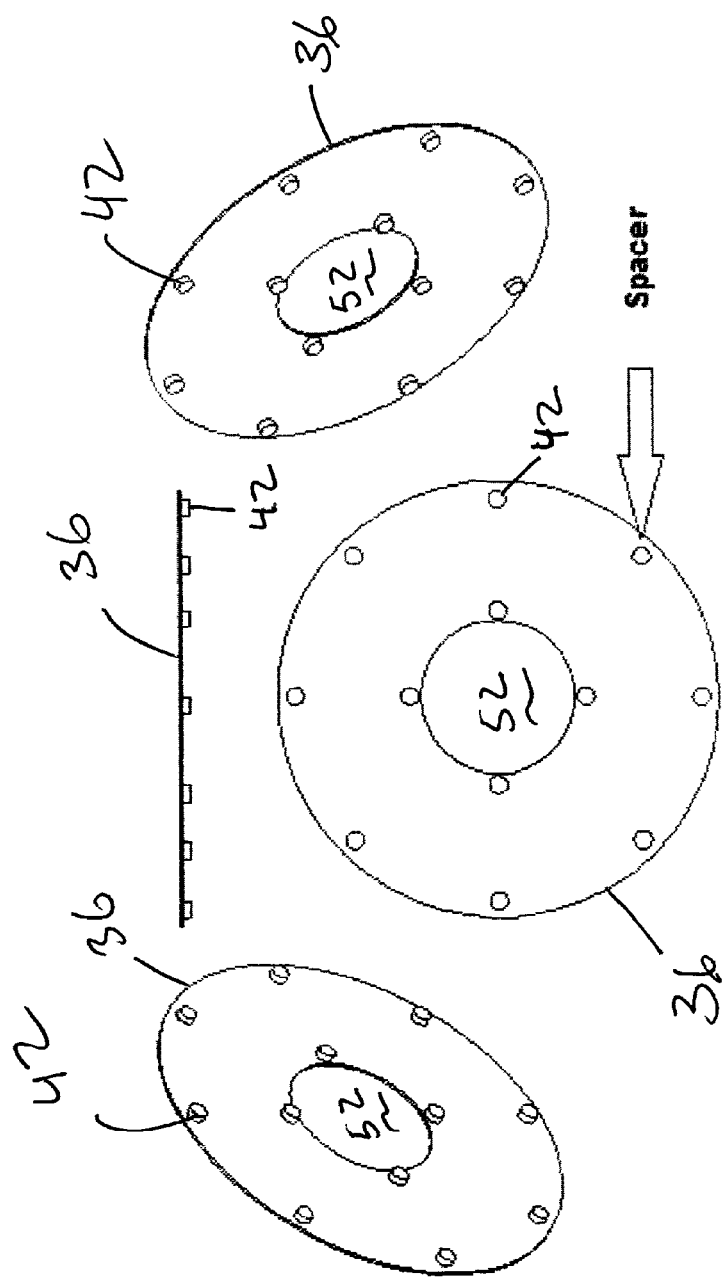
FIG. 9 is a perspective view of a solid disk according to the present invention.
Figure 10:
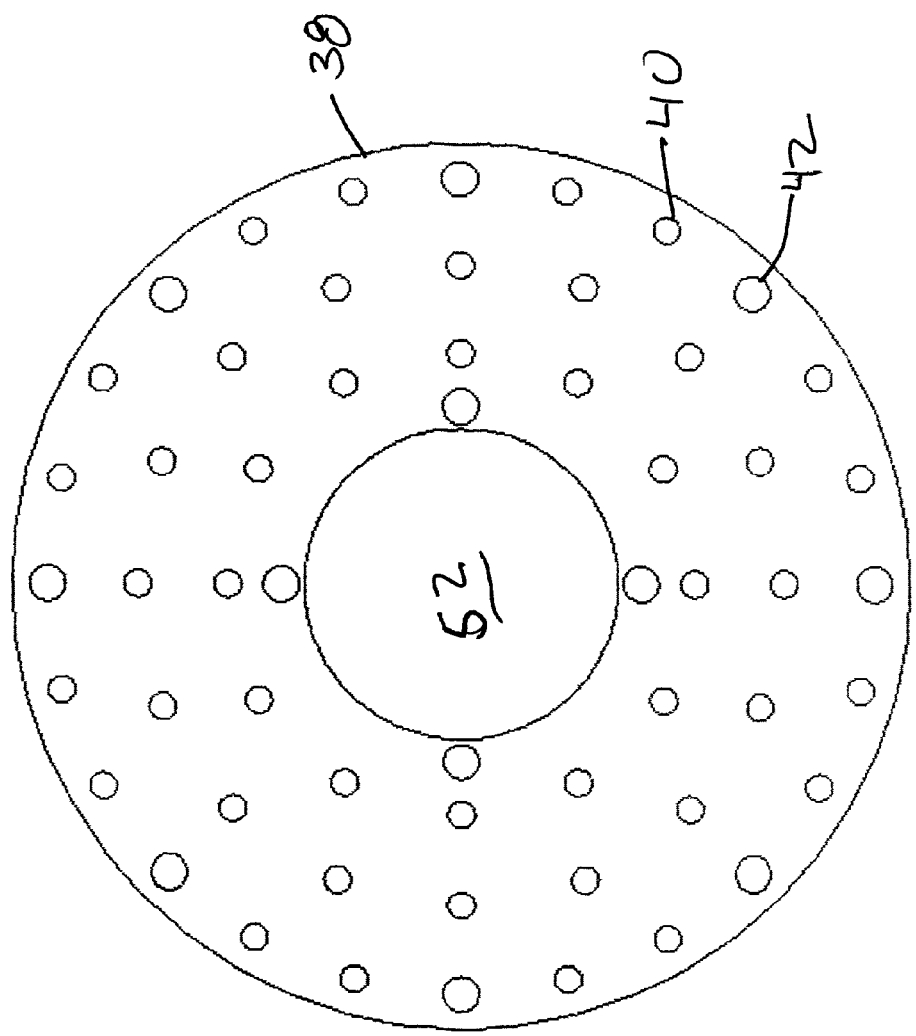
FIG. 10 is a side view of a holed disk according to the present invention.
Figure 11:
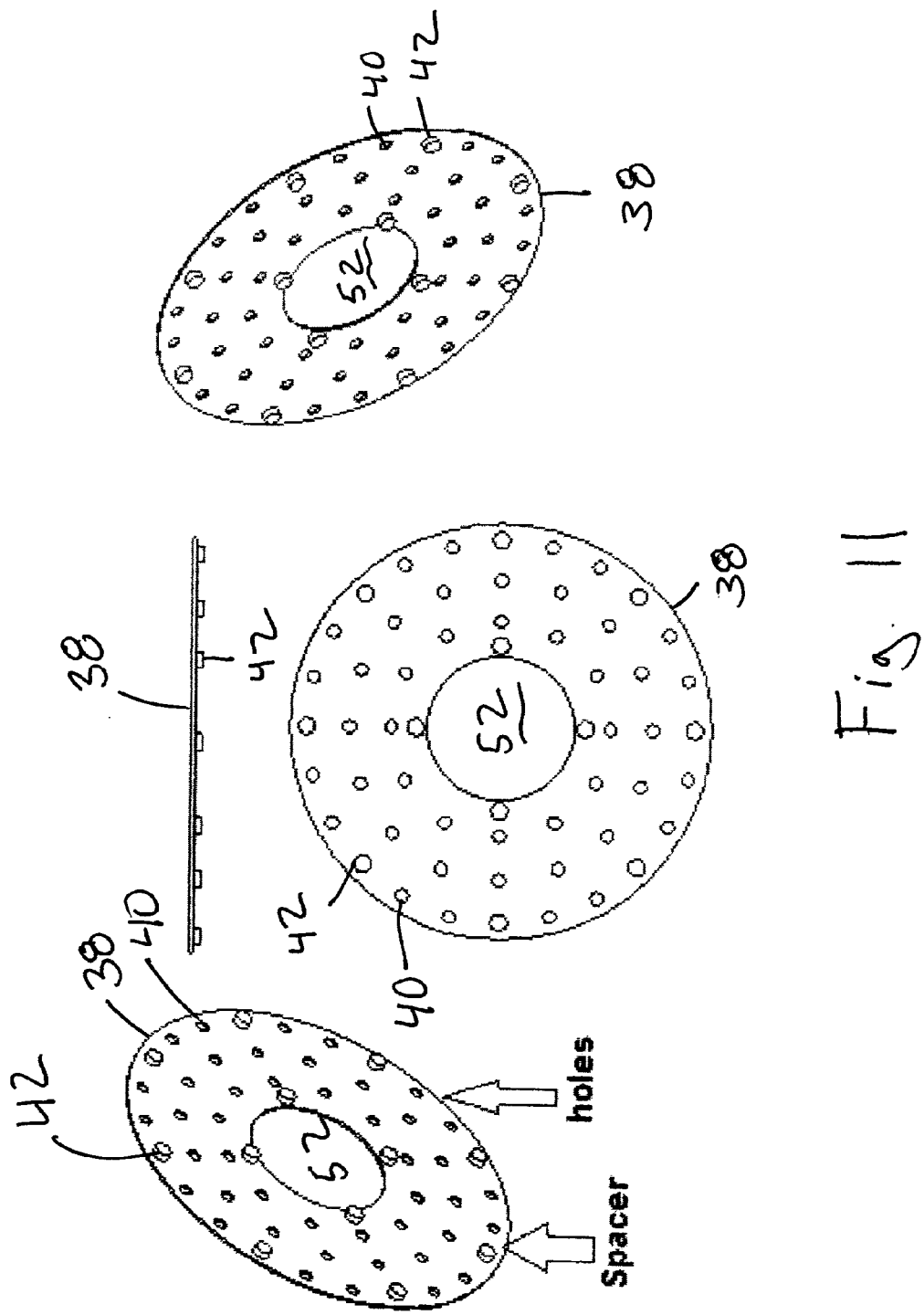
FIG. 11 is a perspective view of a holed disk according to the present invention.
Figure 14:
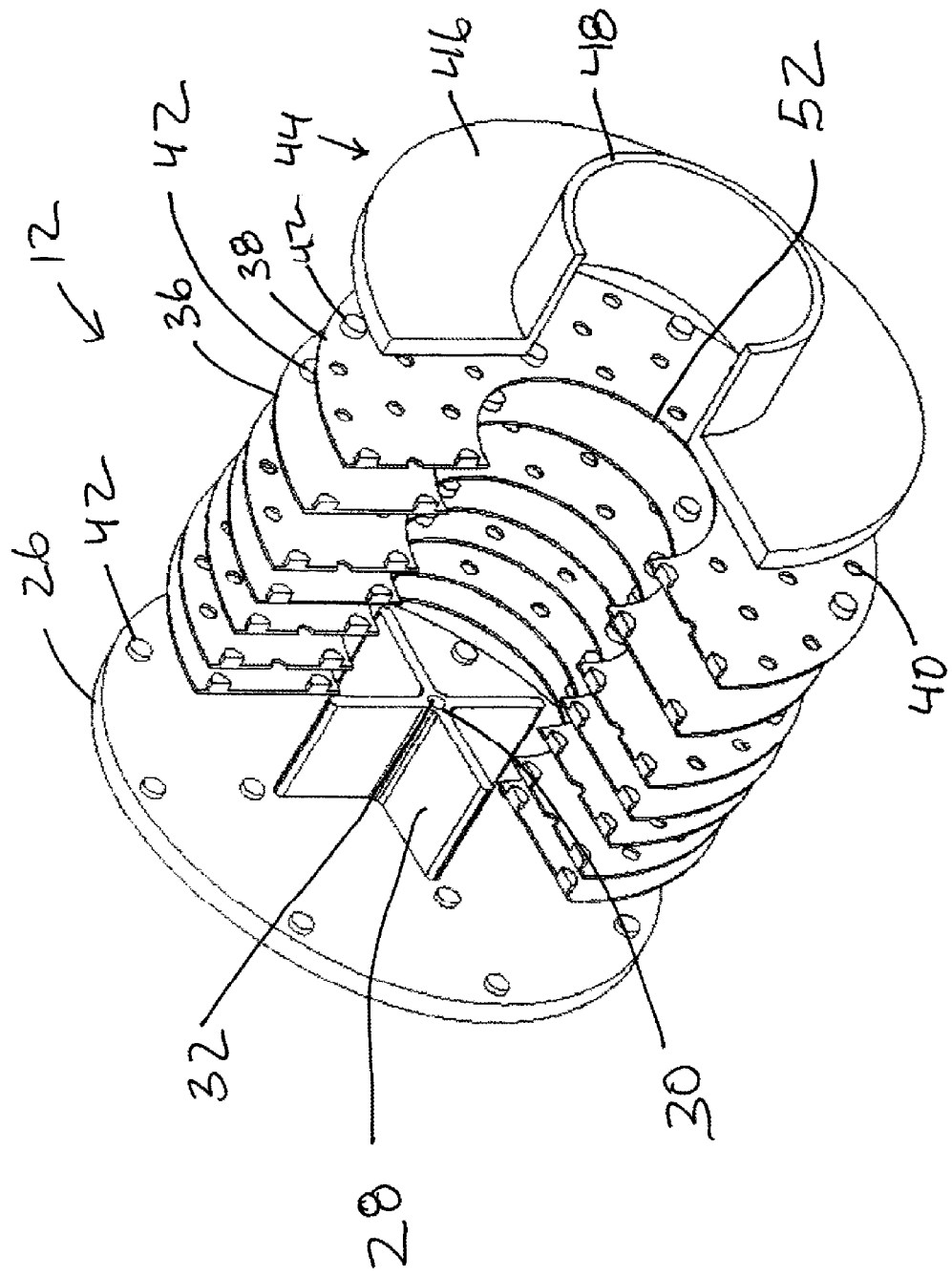
FIG. 14 is a perspective view of an exhaust section of a disk assembly according to the present invention.
Figure 15:
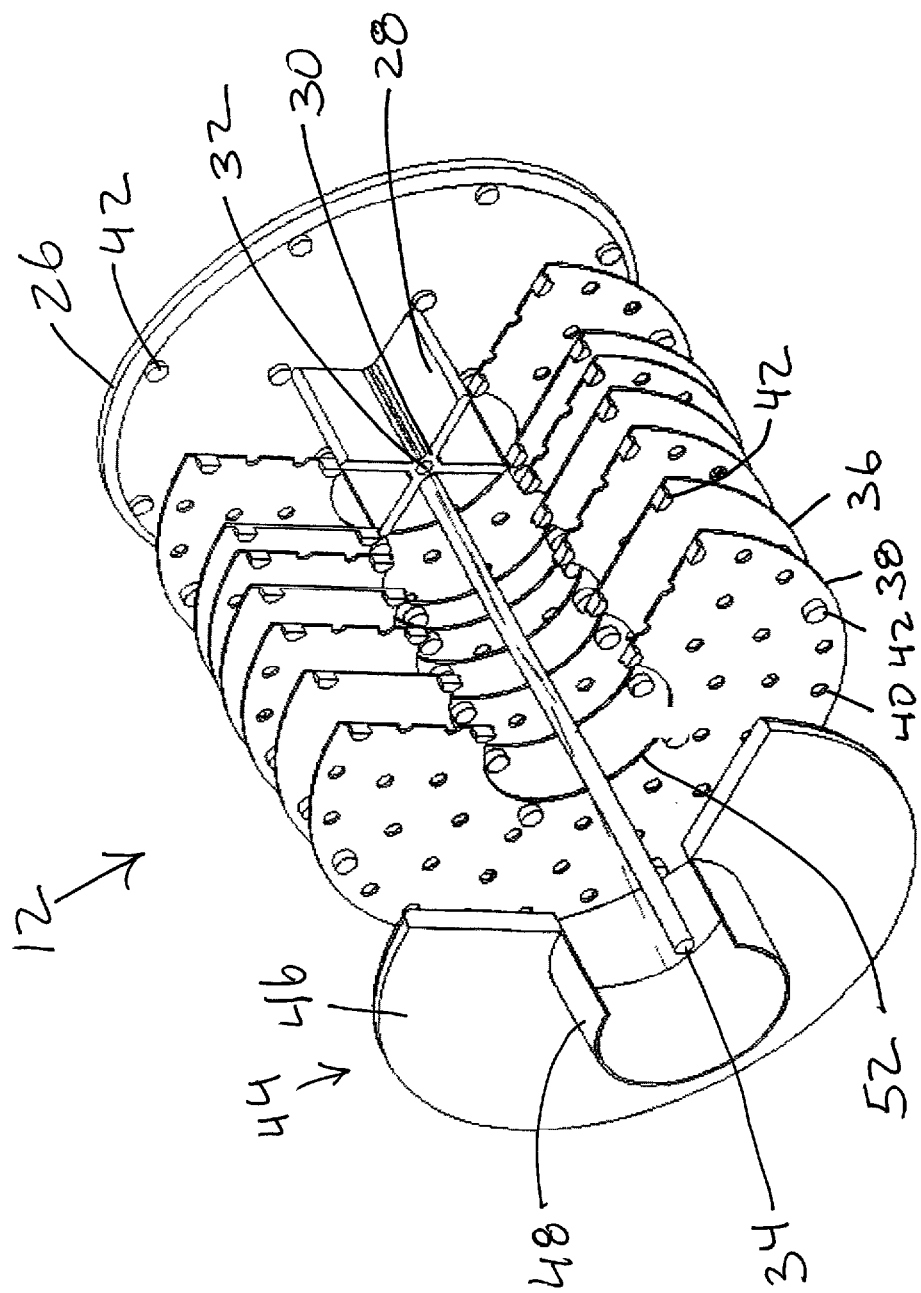
FIG. 15 is a perspective view of an intake section of a disk assembly according to the present invention.

The present invention is a working fluid turbo. FIGS. 1-15 show a working fluid turbo or components thereof. FIG. 1 shows a perspective view of an assembled embodiment of the working fluid turbo 10 according to the present invention. FIGS. 2-3 show internal components of the working fluid turbo 10. There are two sets of spaced disks 12 on a disk assembly 14 that fits into a cylinder shaped housing 16. The housing 16 is shown in FIG. 4 with an open end 18 and two ports 20. One set of disks12 aligns with an intake port 22, which aligns with one of the ports 20 on the housing 16 and the other set of disks 12 align with an exhaust port 24 which aligns with the other of the ports 20 on the housing 16. FIGS. 14 and 15 show the disk assembly in two parts. FIG. 14 shows the set of disks 12 aligned with the exhaust port 24 and FIG. 15 shows the set of disks 12 aligned with the intake port 22. FIG. 14 shows an end plate 26 with X-shaped walls 28 that forms an X-shaped disk shaft 30 in the center and where the end plate 26 is also shown in FIG. 6. The end plate 26 includes a shaft hole 32 in the center of X-shaped shaft 30 to receive a shaft 34 shown in FIG. 5. The set of disks 12 of FIG. 14 alternate solid disks 36 shown in FIGS. 8-9 with holed disks 38 with holes 40 shown in FIGS. 10-11. Both the solid disks 36 and holed disks 38 include spacers 42 extending upward. The spacers 42 provide spacing between the disks 36, 38 to allow for fluid flow. FIGS. 14 and 7 also show a center spacer 44 that includes a disk plate 46 with center hub 48. FIG. 15 shows similar components as shown in FIG. 14. The main difference between FIGS. 14 and 15 is that the hub 48 of the center spacer 44 in FIG. 15 fits into the hub 48 of the center spacer 44 of FIG. 14. All the disks 36, 38 are shown with a center hole 52 to receive the X-shaped walls of the X-shaped disk shaft 30 from the end plate 26. The X-shaped disk shaft 30 allows working fluid to move between the disks 36, 38. The set of disks 12 at each port are attached together over the X-shaped disk shaft 30 and to the end plate 26 and the center spacer 44, such that disks 36, 38, end plate 26 and center spacer 44 rotate together. FIG. 2-3 show an end cap 54 that closes off the open end 18 of the housing 16. The shaft 34 of FIG. 5 is attached in the shaft hole 32 at each end plate 26, such that the shaft 34 rotates with the disk assembly 14 of disks 36, 38, end plates 26 and center spacers 44. FIG. 1 shows the shaft 34 extending outside the housing end caps 54.

Figure 12:
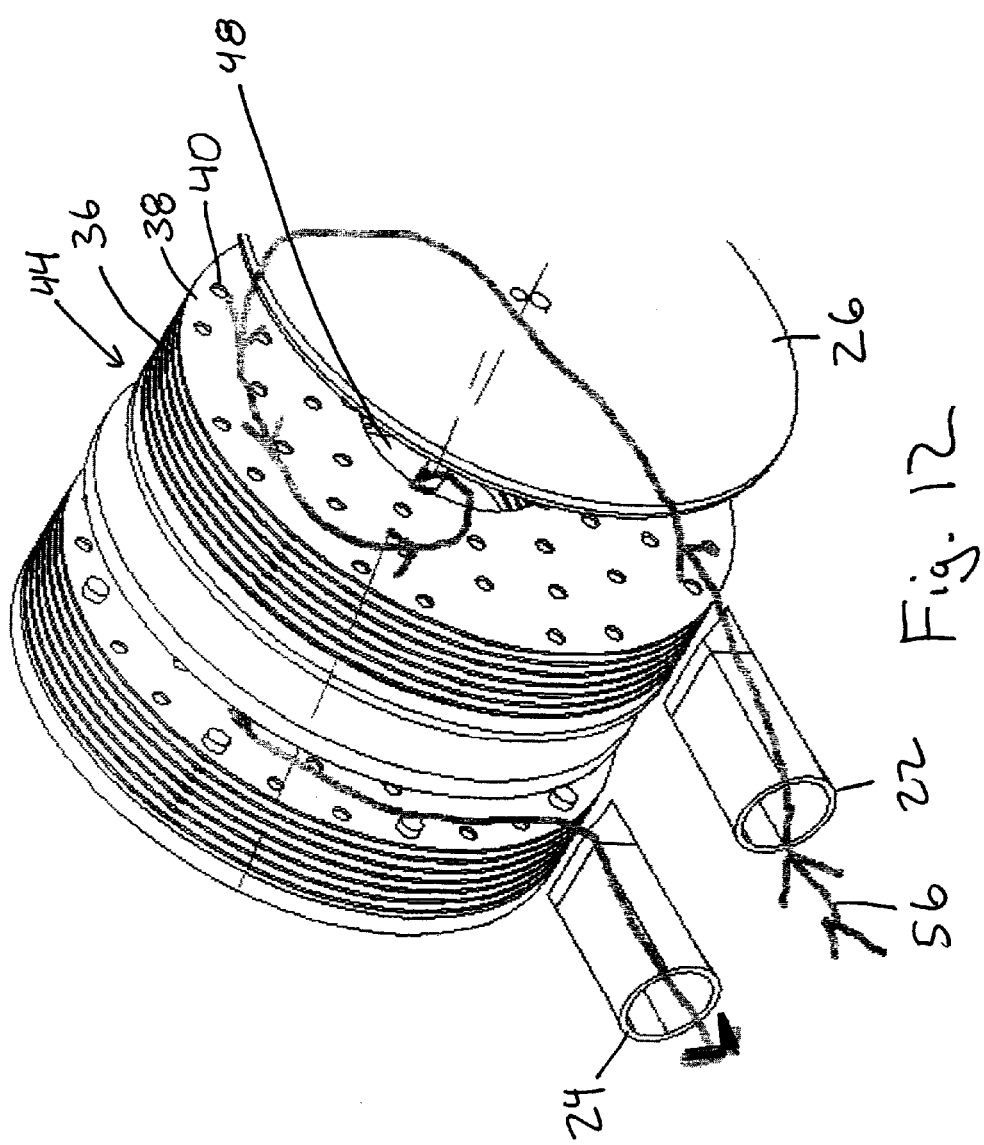
FIG. 12 is a perspective view of internal workings of a working fluid turbo according to the present invention.
Figure 13:
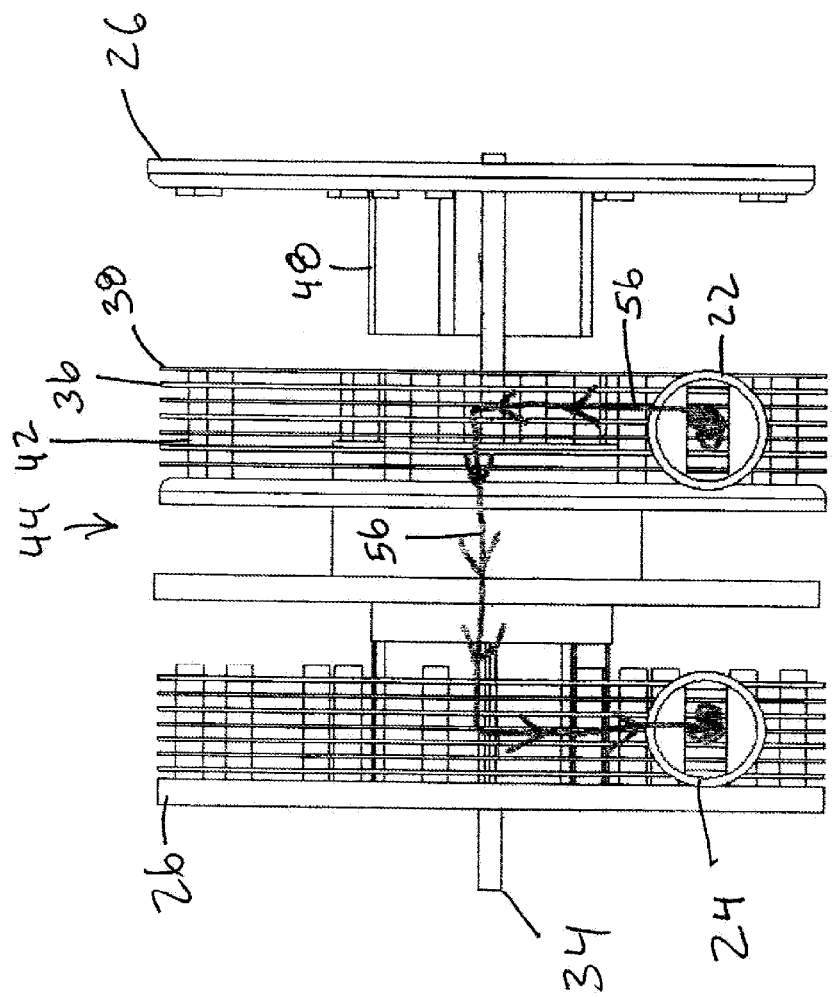
FIG. 13 is a side view of internal workings of a working fluid turbo according to the present invention.

FIGS. 12-13 shown how the working fluid turbo 10 works. The working fluid can be a liquid or a gas. Working fluid 56 enters the intake side 22 as shown by the arrows and spirals toward the center of the disks 36, 38 causing the disks 36, 38 to rotate. The holes 40 in the disks 38 cause the disks 36, 38 to start spinning faster, whereby the holes 40 in disks 38 act like vortex generators on airplane wings, thereby causing the boundary layer to attach longer to the flat disks 36. The holes 40 in the disks 38 also act like a venturi causing the flat disk 36 to be stuck to the disk 38 with holes 40 by vacuum, where the fluid 56 is drawn through the holes 40 in the disks 38 and the fluid 56 turns and follows the spiral rotation of flowing fluid 56 toward the center of the disks 36, 38 and whereby this action generates a lift force in a forward motion and adds to the rpm and torque of the rotation of the disks 36, 38. After spiraling to the center on the intake port side 22, the working fluid 56 is drawn into the hub 48 of center spacer 44 along the X-shaped walls 28 within the center of the spinning disks 36, 38 and out the hub 48 of center spacer 44 along the X-shaped walls 26 of the spinning disks 36, 38 on the exhaust side causing the working fluid turbo 10 to act like the compressor of a jet engine. The working fluid 56 is accelerated in a spiral fashion moving toward the outside of the disks 36, 38 and is pumped out the exhaust port 24 creating a better flow through the working fluid turbo 10. There can be multiple intake ports and multiple exhaust ports situated around the perimeter of the working fluid turbo 10. The rotation of the disks 36, 36 causes the shaft 34 to rotate, where the shaft 34 can be used to power a device.

While different embodiments of the invention have been described in detail herein, it will be appreciated by those skilled in the art that various modifications and alternatives to the embodiments could be developed in light of the overall teachings of the disclosure. Accordingly, the particular arrangements are illustrative only and are not limiting as to the scope of the invention that is to be given the full breadth of any and all equivalents thereof.

I claim:

1. A working fluid turbo comprising:
    an enclosed housing;
    an intake port, said intake port providing a path into said enclosed housing that is adapted to receive a working fluid;
    an exhaust port, said exhaust port providing a path from said enclosed housing that is adapted to exhaust the working fluid;
    at least two sets of a plurality of disks within said enclosed housing comprising a first set of disks of said at least two sets of a plurality of disks aligned with said intake port, said first set of disks adapted to provide a path for the working fluid from said intake port to said second set of disks, said first set of disks adapted to rotate due to intake of the working fluid through said intake port, and a second set of disks of said at least two sets is aligned with said exhaust port; said second set of disks adapted to provide a path for the working fluid from said first set of disks to said exhaust port, said second set of disks adapted to rotate due to exhaust of the working fluid from said first set of disks to the exhaust port;
    a shaft connected to at least one set of said at least two sets of disks such that said shaft rotates when said at least one set of said at least two sets of disks rotates;
    wherein said first set of disks and said second set of disks each includes a plurality of disks which alternate with solid disks and holed disks, said holed disks including a plurality of holes, each of said solid disks and said holed disks including a center hole to provide a path between said solid disks and said holed disks as well as between said first set of disks and said second set of disks and each of said solid disks and said holed disks including spacers to provide open space between said solid disks and said holed disks that allows working fluid flow; and
    wherein said first set of disks and said second set of disks each includes an end plate with X-shaped walls that forms an X-shaped disk shaft that fits into said center holes of said solid disks and said holed disks to hold said solid disks and said holed disks of each set together and in place, whereby said X-shaped disk shaft allows the working fluid to move between said solid disks and said holed disks.

2. The working fluid turbo of claim 1 wherein said first set of disks and said second set of disks each includes a center spacer on a disk plate with a center hub and where each of said center hubs mate together to form a path between said first set of disks and said second set of disks for the working fluid to pass.

3. The working fluid turbo of claim 2, wherein said solid disks and said holed disks are attached together over said X-shaped disk shaft and said center spacer such that said solid disks and said holed disks, said end plate and said center spacer rotate together.

4. The working fluid turbo of claim 3, wherein said end plate includes a shaft hole in a center of said X-shaped disk shaft to receive said shaft, such that said shaft rotates with said solid disks and said holed disks, said end plate and said center spacer.

5. The working fluid turbo of claim 4, wherein said shaft extends outside said enclosed housing.

\* \* \* \* \*